US012275044B1

(12) United States Patent
Itwaru

(10) Patent No.: US 12,275,044 B1
(45) Date of Patent: Apr. 15, 2025

(54) BODILY DECONTAMINATION DEVICE

(71) Applicant: Nariendath Itwaru, Jackson, NJ (US)

(72) Inventor: Nariendath Itwaru, Jackson, NJ (US)

( * ) Notice: Subject to any disclaimer, the term of this patent is extended or adjusted under 35 U.S.C. 154(b) by 19 days.

(21) Appl. No.: 18/382,425

(22) Filed: Oct. 20, 2023

(51) Int. Cl.
*B08B 13/00* (2006.01)
*B08B 5/02* (2006.01)

(52) U.S. Cl.
CPC .................................... *B08B 5/02* (2013.01)

(58) Field of Classification Search
None
See application file for complete search history.

(56) References Cited

U.S. PATENT DOCUMENTS

| | | | |
|---|---|---|---|
| 5,277,654 A | 1/1994 | Fenn | |
| 5,692,954 A | 12/1997 | Lee | |
| 5,816,908 A | 10/1998 | Tsou | |
| 9,630,219 B2 | 4/2017 | Templeton | |
| D812,248 S | 3/2018 | Leckrone | |
| 10,239,098 B2 * | 3/2019 | Ding | F24F 11/77 |
| 2010/0001097 A1 | 1/2010 | Spivak | |
| 2012/0111749 A1 | 5/2012 | Chang | |

FOREIGN PATENT DOCUMENTS

| | | |
|---|---|---|
| WO | WO2021206648 | 10/2021 |

* cited by examiner

*Primary Examiner* — Eric W Golightly

(57) ABSTRACT

A bodily decontamination device includes a cylinder that has an entrance extending into an interior of the cylinder to accommodate a user. The cylinder is vertically oriented to facilitate the user to stand in the cylinder. A first blower is integrated into the cylinder to urge air to flow downwardly over the user when the user is standing in the cylinder for blowing dust and particles off of the user. A second blower is integrated into the cylinder which blows air laterally onto the user when the user is standing in the cylinder for blowing dust and particles off of the user. A third blower is integrated into the cylinder that has a direction of flow that is colinear with the direction of flow of the first blower to blow the dust and particles from the user outwardly through the exhaust.

11 Claims, 5 Drawing Sheets

BODILY DECONTAMINATION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to decontamination devices and more particularly pertains to a new decontamination device for removing dust and particles from a user. The device includes a cylinder into which a user can enter and a series of blowers that can urge air downwardly in the cylinder and outwardly from the cylinder. The device includes a blower that is oriented to surround the user and blow air laterally onto the user to dislodge dust and particles from the user. In this way the series of blowers blows the air downwardly and outwardly from the cylinder to expel the dust and particles.

(2) Description of Related Art Including Information Disclosed Under 37 CFR 1.97 and 1.98

The prior art relates to decontamination devices including a variety of decontamination chamber devices that each includes a rectangular housing and a series of blowers for decontaminating an occupant of dust and particles. In no instance does the prior art disclose a decontamination device that includes a cylindrical housing and a series of blowers to decontaminate an occupant of dust and particles.

BRIEF SUMMARY OF THE INVENTION

An embodiment of the disclosure meets the needs presented above by generally comprising a cylinder that has an entrance extending into an interior of the cylinder to accommodate a user. The cylinder is vertically oriented to facilitate the user to stand in the cylinder. A first blower is integrated into the cylinder to urge air to flow downwardly over the user when the user is standing in the cylinder for blowing dust and particles off of the user. A second blower is integrated into the cylinder which blows air laterally onto the user when the user is standing in the cylinder for blowing dust and particles off of the user. A third blower is integrated into the cylinder that has a direction of flow that is colinear with the direction of flow of the first blower to blow the dust and particles from the user outwardly through the exhaust.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
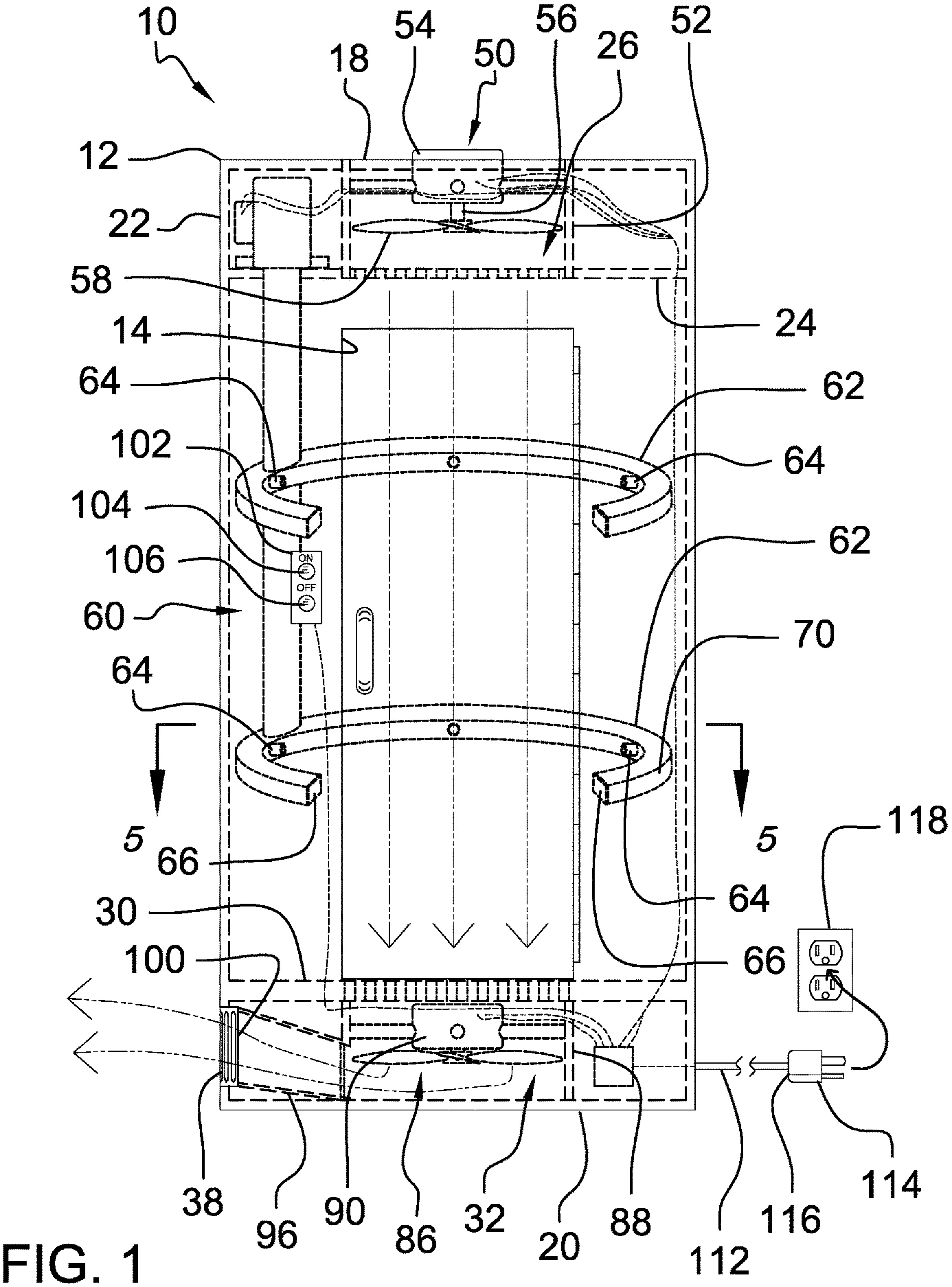
FIG. 1 is a front phantom view of a bodily decontamination device according to an embodiment of the disclosure.
Figure 2:
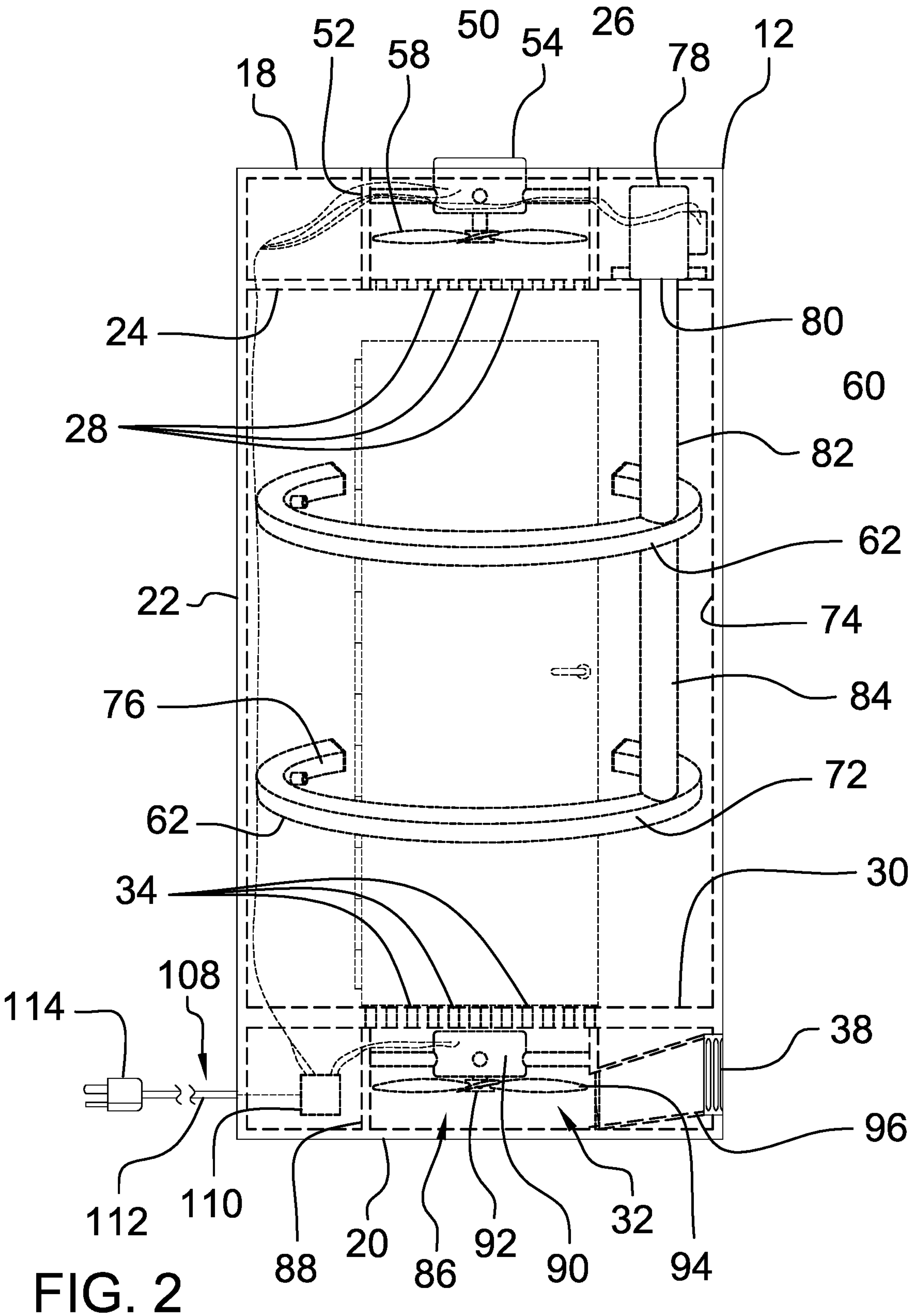
FIG. 2 is a back phantom view of an embodiment of the disclosure.
Figure 3:
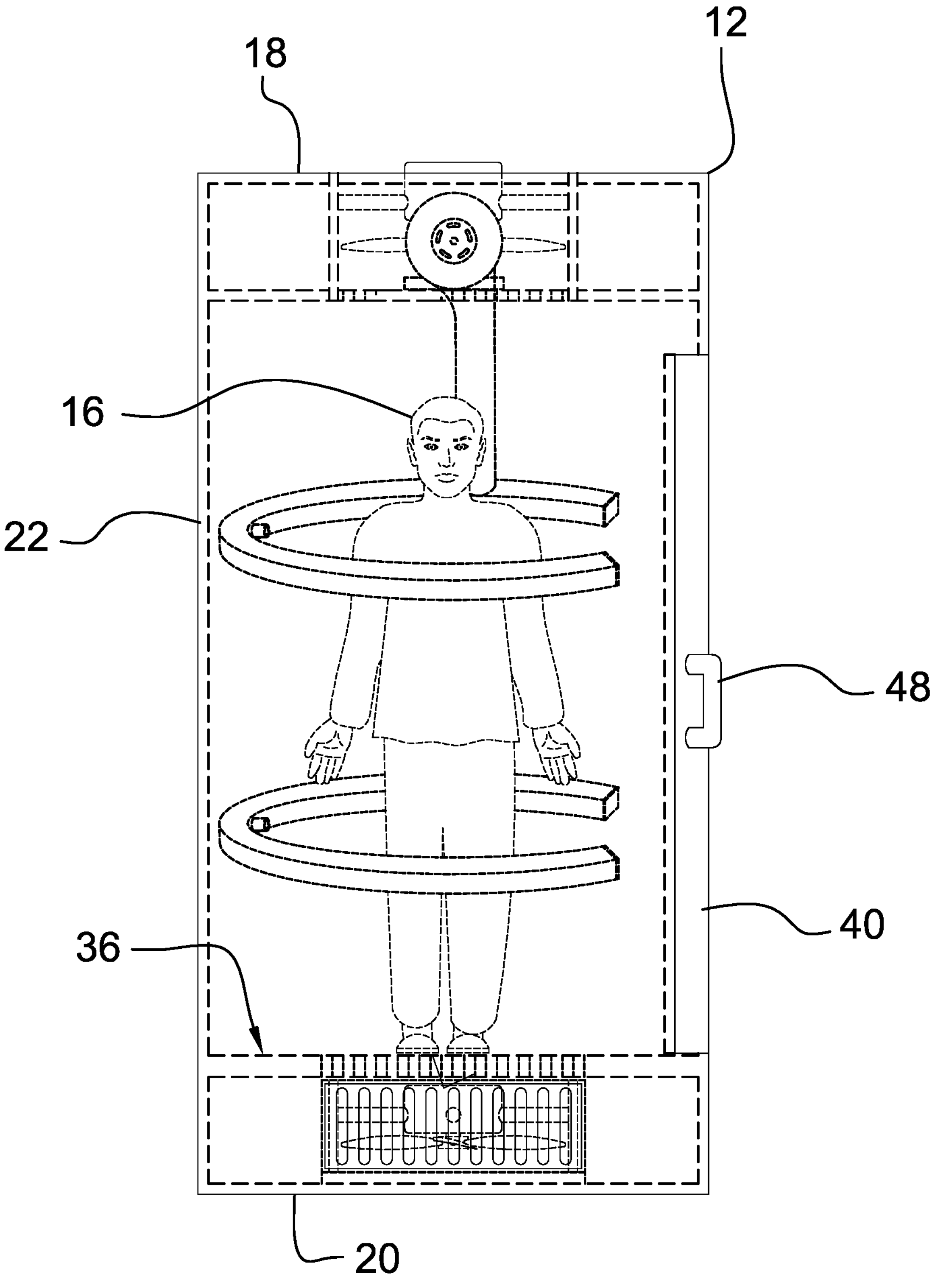
FIG. 3 is a phantom in-use view of an embodiment of the disclosure.
Figure 4:
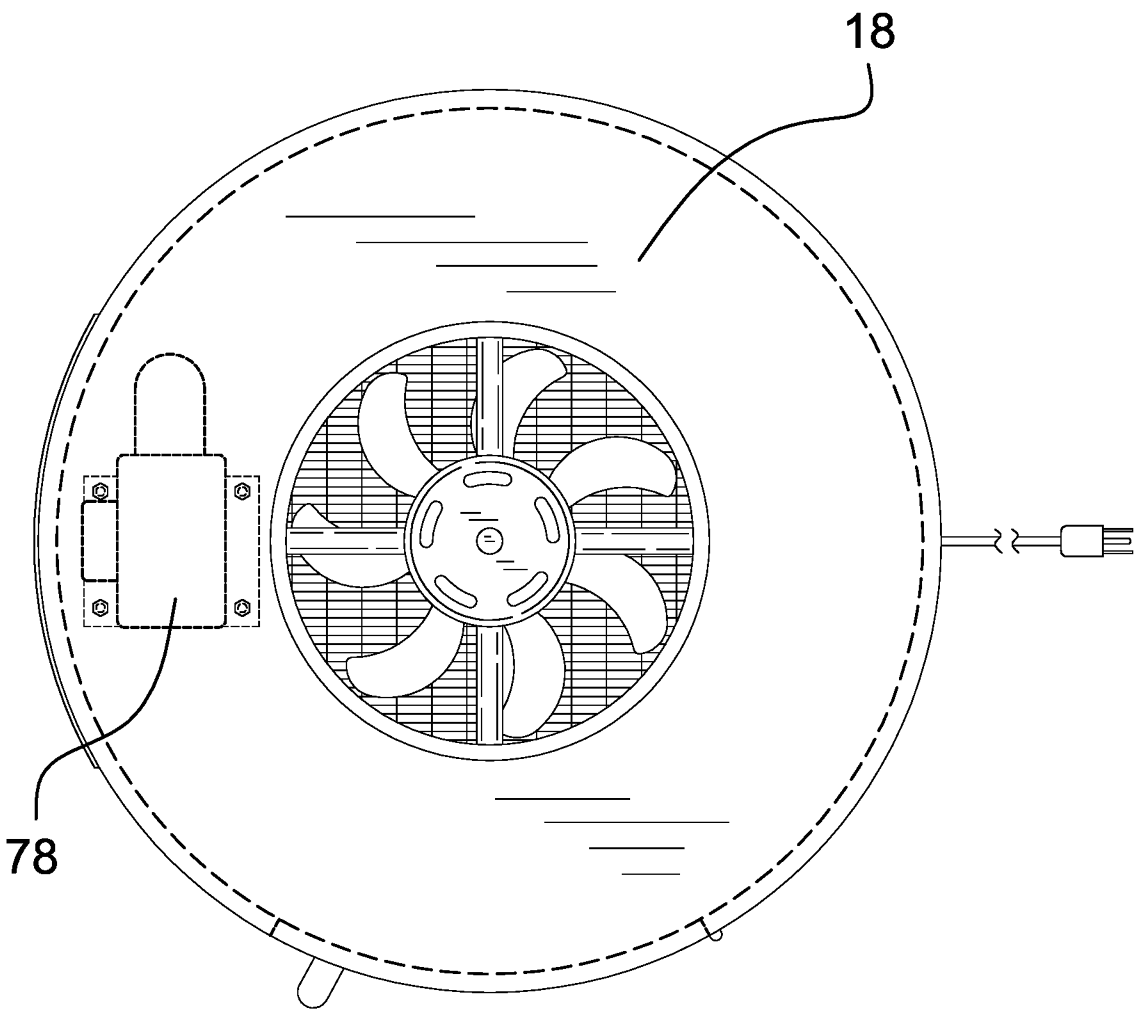
FIG. 4 is a top view of an embodiment of the disclosure.
Figure 5:
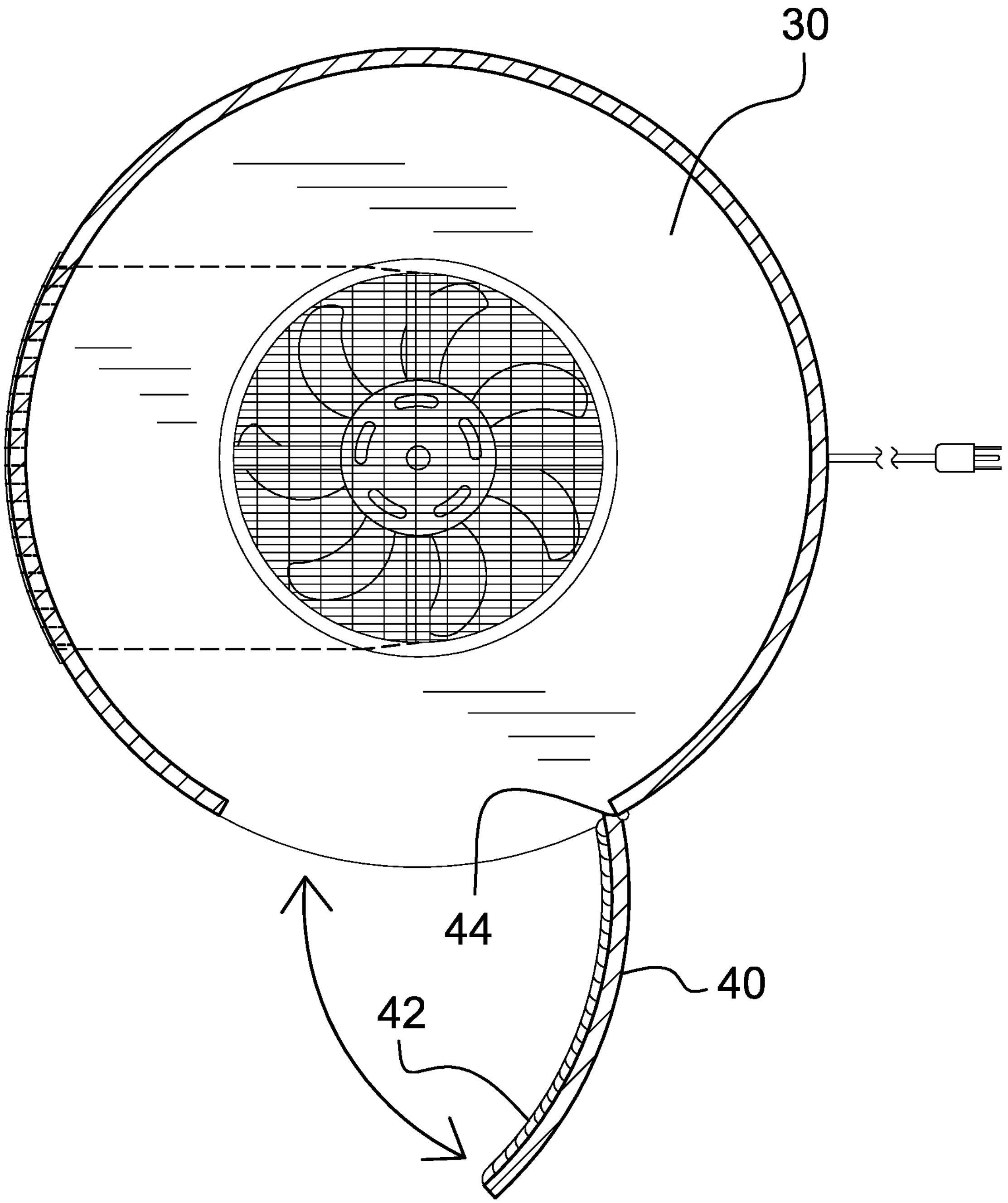
FIG. 5 is a cross sectional view taken along line 5-5 of FIG. 1 of an embodiment of the disclosure.

With reference now to the drawings, and in particular to FIGS. 1 through 5 thereof, a new air blower device embodying the principles and concepts of an embodiment of the disclosure and generally designated by the reference numeral 10 will be described.

As best illustrated in FIGS. 1 through 5, the bodily decontamination device 10 generally comprises a cylinder 12 that has an entrance 14 extending into an interior of the cylinder 12 to accommodate a user 16. Furthermore, the cylinder 12 is vertically oriented to facilitate the user 16 to stand in the cylinder 12. The cylinder 12 may have a height of at least 2.0 meters and a diameter of at least 60.0 cm. The cylinder 12 has an upper end 18, a lower end 20 and an outer wall 22 extending between the upper end 18 and the lower end 20.

The cylinder 12 has an upper divider 24 that is spaced from and lies on a plane that is oriented parallel to the upper end 18 to define a first blower space 26 between the upper divider 24 and the upper end 18. The upper divider 24 has a plurality of air holes 28 each extending through the upper divider 24 such that the first blower space 26 is in fluid communication with an interior of the cylinder 12. The cylinder 12 has a lower divider 30 that is spaced from and lies on a plane which is oriented parallel to the lower end 20 to define a second blower space 32 between the lower divider 30 and the lower end 20. The lower divider 30 has a plurality of air holes 34 each extending through the lower divider 30 such that the second blower space 32 is in fluid communication with the interior of the cylinder 12. Furthermore, the lower divider 30 defines a floor 36 in the cylinder 12 for the user 16 to stand on the floor 36 when the user 16 enters the cylinder 12 through the entrance 14. The entrance 14 extends through the outer wall 22 and the entrance 14 extends from the lower divider 30 toward the upper divider 24. Additionally, the outer wall 22 has an exhaust 38 extending into the second blower space 32.

A door 40 is hingedly coupled to the cylinder 12 and the door 40 is aligned with the entrance 14 for opening and closing the entrance 14. The door 40 has a seal 42 which forms a fluid impermeable seal with the cylinder 12 when the door 40 is closed. The door 40 has a hinged edge 44 that is hingedly coupled to a bounding edge 46 of the entrance 14 and the door 40 has a handle 48 that is pivotally attached to the door 40 for opening and closing the door 40. The seal 42 may be comprised of a resiliently compressible material, including but not being limited to, rubber or silicone such that the seal 42 is compressed between the door 40 and the outer wall 22 of the cylinder 12.

A first blower 50 is integrated into the cylinder 12 and the first blower 50 is oriented to have a direction of flow moving downwardly in the cylinder 12. In this way the first blower 50 can urge air to flow downwardly over the user 16 when the user 16 is standing in the cylinder 12 for blowing dust and particles off of the user 16. The first blower 50 comprises a first housing 52 that is positioned within the first blower space 26 and the first housing 52 surrounds the plurality of air holes 28 in the upper divider 24. The first blower 50 includes a motor 54 that is integrated into the upper end 18 of the cylinder 12; the motor 54 has an output shaft 56 extending into the first blower space 26 and the motor 54 may comprise an electric motor or the like. The first blower 50 includes a fan 58 which is coupled to the output shaft 56 such that the fan 58 is positioned in the first housing 52. The fan 58 is aligned with the plurality of air holes 28 in the upper divider 24 to blow air downwardly through the plurality of air holes 28 in the upper divider 24 when the motor 54 is turned on.

A second blower 60 is integrated into the cylinder 12 and the second blower 60 includes a pair of curved ducts 62 that are positioned within the cylinder 12. Each of the curved ducts 62 extends around the user 16 when the user 16 is standing in the cylinder 12. Additionally, the second blower 60 has a direction of flow that is directed outwardly through a plurality of outlet nozzles 64 each integrated into a respective one of the pair of curved ducts 62. In this way the second blower 60 can blow air laterally onto the user 16 when the user 16 is standing in the cylinder 12 for blowing dust and particles off of the user 16.

Each of the curved ducts 62 has a first end 66, a second end 68 and an outside wall 70 extending between the first end 66 and the second end 68. Each of the curved ducts 62 is elongated between the first end 66 and the second end 68 and the outside wall 70 of each of the curved ducts 62 is continuously arcuate between the first end 66 and the second end 68. A back side 72 of the outside wall 70 of each of the curved ducts 62 is attached to an inside surface 74 of the outer wall 22 of the cylinder 12. Each of the pair of curved ducts 62 is oriented to lie on a horizontal plane and the pair of curved ducts 62 is evenly spaced apart from each other and is distributed between the lower divider 30 and the upper divider 24. Each of the plurality of outlet nozzles 64 is integrated into a front side 76 of the outside wall 70 of the respective curved duct 62. The outlet nozzles 64 are spaced apart from each other and are distributed between the first end 66 and the second end 68 of the respective curved duct 62.

The second blower 60 includes a blower unit 78 that is positioned within the first blower space 26. The blower unit 78 is positioned between the outer wall 22 of the cylinder 12 and the first housing 52 associated with the first blower 50 and the blower unit 78 has an output 80 extending through the upper divider 24. The second blower 60 includes a first conduit 82 that is fluidly coupled between the output 80 of the blower unit 78 and a respective one of the curved ducts 62. The blower unit 78 may comprise an electric blower that includes a motor and a fan contained within the blower unit 78. The second blower 60 includes a second conduit 84 that is fluidly coupled between the pair of curved ducts 62 to blow air into each of the curved ducts 62 and outwardly through each of the plurality of outlet nozzles 64 on the pair of curved ducts 62.

A third blower 86 is integrated into the cylinder 12 and the third blower 86 is positioned on an opposing end of the cylinder 12 with respect to the first blower 50. The third blower 86 is in communication with the exhaust 38 in the cylinder 12 and the third blower 86 is oriented to have a direction of flow that is colinear with the direction of flow of the first blower 50. In this way the third blower 86 can blow the dust and particles from the user 16 outwardly through the exhaust 38 thereby facilitating the user 16 to be cleaned of the dust and particles.

The third blower 86 comprises a second housing 88 that is positioned within the second blower space 32 and the second housing 88 surrounds the air holes 34 in the lower divider 30. The third blower 86 includes a motor 90 that is positioned within the second housing 88 and the motor 90 associated with the third blower 86 has an output shaft 92 that is directed toward the lower end 20 of the cylinder 12. The third blower 86 includes a fan 94 that is attached to the output shaft 92 associated with the third blower 86. The fan 94 associated with the third blower 86 is aligned with the plurality of air holes 34 in the lower divider 30 to urge the dust and particles through the air holes 34 in the lower divider 30 and into the second housing 88 when the motor 90 associated with the third blower 86 is turned on.

An exhaust port 96 is fluidly coupled between the second housing 88 and the exhaust 38 in the outer wall 22 of the cylinder 12 to facilitate the third blower 86 to blow air outwardly through the exhaust 38. The exhaust port 96 includes a mesh screen 98 that is aligned with the exhaust 38 in the outer wall 22 of the cylinder 12 to inhibit objects from entering the exhaust port 96 from outside of the cylinder 12. A filter 100 is positioned within the exhaust port 96 to filter the dust and particles from the air being blown into the exhaust port 96 thereby inhibiting the dust and particles from being released from the cylinder 12. The filter 100 may comprise a high efficiency particulate air (hepa) filter or other type of filter that can filter particles with a size of at least 0.3 microns.

A control panel 102 is positioned within the cylinder 12 such that the control panel 102 is accessible to the user 16 when the user 16 is standing in the cylinder 12. The control panel 102 includes an on button 104 and an off button 106 and the control panel 102 is electrically coupled to the motor 54 associated with the first blower 50, the motor 90 associated with the third blower 86 and the blower unit 78. Each of the motor 54 associated with the first blower 50, the motor 90 associated with the third blower 86 and the blower unit 78 is turned on when the on button 104 is depressed. Conversely, each of the motor 54 associated with the first blower 50, the motor 90 associated with the third blower 86 and the blower unit 78 is turned off when the off button 106 is depressed.

A power supply 108 is integrated into the cylinder 12 and the power supply 108 is electrically coupled to the motor 54 associated with the first blower 50, the motor 90 associated with the third blower 86 and the blower unit 78. The power supply 108 comprises a motor controller 110 that is electrically coupled to the motor 54 associated with the first blower 50, the motor 90 associated with the third blower 86 and the blower unit 78. The power supply 108 includes a power cord 112 that is coupled to and extends away from the cylinder 12 and the power cord 112 is electrically coupled to the motor controller 110. The power cord 112 has a male plug 114 that is electrically coupled to a distal end 116 of the power cord 112 for plugging in to a female electrical outlet 118.

In use, the user 16 enters the cylinder 12, closes the door 40 and depresses the on button 104. In this way the first blower 50 and the blower unit 78 blow air onto the user 16 at a velocity that is sufficient to dislodge dust particles, pollen particles and other particles from the user's clothing, hair and body. In additionally, the third blower 86 urges the dislodged dust particles, the pollen particles and the other particles into the filter 100 for to be collected while the filtered air passes outwardly through the exhaust 38. In this way the user 16 can be prepared to enter a clean room, for example, or other location that requires a high level of cleanliness. Furthermore, the curvature of the outer wall 22 of the cylinder 12 reduces the amount of turbulence in the air as compared to a container with interior corners to enhance the efficiently with which the dust and particles are removed from the cylinder 12.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bodily decontamination device for blowing dust and particles off of a user, said device comprising:

a cylinder having an entrance extending into an interior of said cylinder wherein said cylinder is configured to accommodate a user, said cylinder being vertically oriented wherein said cylinder is configured to facilitate the user to stand in said cylinder, said cylinder including an exhaust being integrated into said cylinder;

a door being hingedly coupled to said cylinder, said door being aligned with said entrance for opening and closing said entrance;

a first blower being integrated into said cylinder, said first blower being oriented to have a direction of flow moving downwardly in said cylinder wherein said first blower is configured to urge air to flow downwardly over the user when the user is standing in said cylinder for blowing dust and particles off of the user;

a second blower being integrated into said cylinder, said second blower including a pair of curved ducts being positioned within said cylinder wherein each of said curved ducts is configured to extend around the user when the user is standing in said cylinder, said second blower having a direction of flow being directed outwardly through a plurality of outlet nozzles each being integrated into a respective one of said pair of curved ducts wherein said second blower is configured to blow air laterally onto the user when the user is standing in said cylinder for blowing dust and particles off of the user; and a third blower being integrated into said cylinder, said third blower being positioned on an opposing end of said cylinder with respect to said first blower, said third blower being in communication with said exhaust in said cylinder, said third blower being oriented to have a direction of flow that is colinear with said direction of flow of said first blower wherein said third blower is configured to blow the dust and particles from the user outwardly through said exhaust thereby facilitating the user to be cleaned of the dust and particles.

2. The device according to claim 1, wherein:

said cylinder has an upper end, a lower end and an outer wall extending between said upper end and said lower end;

said cylinder has an upper divider being spaced from and lying on a plane being oriented parallel to said upper end to define a first blower space between said upper divider and said upper end;

said upper divider has a plurality of air holes each extending through said upper divider such that said first blower space is in fluid communication with an interior of said cylinder;

said cylinder has a lower divider being spaced from and lying on a plane being oriented parallel to said lower end to define a second blower space between said lower divider and said lower end;

said lower divider has a plurality of air holes each extending through said lower divider such that said second blower space is in fluid communication with said interior of said cylinder; and said lower divider defines a floor in said cylinder wherein said floor is configured to have the user stand on said floor when the user enters said cylinder through said entrance.

3. The device according to claim 2, wherein said first blower comprises:

a first housing being positioned within said first blower space, said first housing surrounding said plurality of air holes in said upper divider;

a motor being integrated into said upper end of said cylinder, said motor having an output shaft extending into said first blower space; and a fan being coupled to said output shaft such that said fan is positioned in said first housing, said fan being aligned with said plurality of air holes in said upper divider wherein said fan is configured to blow air downwardly through said plurality of air holes in said upper divider when said motor is turned on.

4. The device according to claim 2, wherein:
each of said curved ducts has a first end, a second end and an outside wall extending between said first end and said second end, each of said curved ducts being elongated between said first end and said second end, said outside side wall of each of said curved ducts being continuously arcuate between said first end and said second end;
a back side of said outside wall of each of said curved ducts is attached to an inside surface of said outer wall of said cylinder;
each of said pair of curved ducts is oriented to lie on a horizontal plane;
said pair of curved ducts is evenly spaced apart from each other and being distributed between said lower divider and said upper divider;
each of said plurality of outlet nozzles is integrated into a front side of said outside wall of said respective curved duct; and
said outlet nozzles are spaced apart from each other and are distributed between said first end and said second end of said respective curved duct.

5. The device according to claim 2, wherein said second blower includes:
a blower unit being positioned within said first blower space, said blower unit being positioned between said outer wall of said cylinder and a first housing associated with said first blower, said blower unit having an output extending through said upper divider;
a first conduit being fluidly coupled between said output of said blower unit and a respective one of said curved ducts; and
a second conduit being fluidly coupled between said pair of curved ducts wherein said blower unit is configured to blow air into each of said curved ducts and outwardly through each of said plurality of outlet nozzles on said pair of curved ducts.

6. The device according to claim 2, wherein said third blower comprises:
a second housing being positioned within said second blower space, said second housing surrounding said air holes in said lower divider;
a motor being positioned within said second housing, said motor associated with said third blower having an output shaft being directed toward said lower end of said cylinder; and
a fan being attached to said output shaft associated with said third blower, said fan associated with said third blower being aligned with said plurality of air holes in said lower divider wherein said fan associated with said third blower is configured to urge the dust and particles through said air holes in said lower divider and into said second housing when said motor associated with said third blower is turned on.

7. The device according to claim 6, further comprising an exhaust port being fluidly coupled between said second housing and said exhaust in said outer wall of said cylinder wherein said exhaust port is configured to facilitate said third blower to blow air outwardly through said exhaust, said exhaust port including a mesh screen being aligned with said exhaust in said outer wall of said cylinder wherein said mesh screen is configured to inhibit objects from entering said exhaust port from outside of said cylinder.

8. The device according to claim 7, further comprising a filter being positioned within said exhaust port wherein said filter is configured to filter the dust and particles from the air being blown into said exhaust port thereby inhibiting the dust and particles from being released from said cylinder.

9. The device according to claim 1, wherein:
said first blower includes a motor;
said second blower includes a blower unit;
said third blower includes a motor;
said device includes a control panel being positioned within said cylinder wherein said control panel is configured to be accessible to the user when the user is standing in said cylinder;
said control panel includes an on button and an off button;
said control panel is electrically coupled to said motor associated with said first blower and said motor associated with said third blower and said blower unit;
each of said motor associated with said first blower and said motor associated with said third blower and said blower unit is turned on when said on button is depressed; and
each of said motor associated with said first blower and said motor associated with said third blower and said blower unit is turned off when said off button is depressed.

10. The device according to claim 1, wherein:
said first blower includes a motor;
said second blower includes a blower unit;
said third blower includes a motor; and
a power supply is integrated into said cylinder, said power supply being electrically coupled to said motor associated with said first blower and said motor associated with said third blower and said blower unit, said power supply comprising:
a motor controller being electrically coupled to said motor associated with said first blower and said motor associated with said third blower and said blower unit; and
a power cord being coupled to and extending away from said cylinder, said power cord being electrically coupled to said motor controller, said power cord having a male plug being electrically coupled to a distal end of said power cord for plugging in to a female electrical outlet.

11. A bodily decontamination device for blowing dust and particles off of a user, said device comprising:
a cylinder having an entrance extending into an interior of said cylinder wherein said cylinder is configured to accommodate a user, said cylinder being vertically oriented wherein said cylinder is configured to facilitate the user to stand in said cylinder, said cylinder having an upper end, a lower end and an outer wall extending between said upper end and said lower end, said cylinder having an upper divider being spaced from and lying on a plane being oriented parallel to said upper end to define a first blower space between said upper divider and said upper end, said upper divider having a plurality of air holes each extending through said upper divider such that said first blower space is in fluid communication with an interior of said cylinder, said cylinder having a lower divider being spaced from and lying on a plane being oriented parallel to said lower end to define a second blower space between said lower divider and said lower end, said lower divider having a plurality of air holes each extending through said lower divider such that said second blower space is in fluid communication with said interior of said cylinder, said lower divider defining a floor in said cylinder wherein said floor is configured to have the user stand on said floor when the user enters said cylinder through said entrance, said entrance extending through said outer wall, said entrance extending from said lower divider toward said upper divider, said outer wall having an exhaust extending into said second blower space;

a door being hingedly coupled to said cylinder, said door being aligned with said entrance for opening and closing said entrance, said door having a seal which forms a fluid impermeable seal with said cylinder when said door is closed, said door having a hinged edge being hingedly coupled to a bounding edge of said entrance, said door having a handle being pivotally attached to said door for opening and closing said door;

a first blower being integrated into said cylinder, said first blower being oriented to have a direction of flow moving downwardly in said cylinder wherein said first blower is configured to urge air to flow downwardly over the user when the user is standing in said cylinder for blowing dust and particles off of the user, said first blower comprising:

a first housing being positioned within said first blower space, said first housing surrounding said plurality of air holes in said upper divider;

a motor being integrated into said upper end of said cylinder, said motor having an output shaft extending into said first blower space; and a fan being coupled to said output shaft such that said fan is positioned in said first housing, said fan being aligned with said plurality of air holes in said upper divider wherein said fan is configured to blow air downwardly through said plurality of air holes in said upper divider when said motor is turned on;

a second blower being integrated into said cylinder, said second blower including a pair of curved ducts being positioned within said cylinder wherein each of said curved ducts is configured to extend around the user when the user is standing in said cylinder, said second blower having a direction of flow being directed outwardly through a plurality of outlet nozzles each being integrated into a respective one of said pair of curved ducts wherein said second blower is configured to blow air laterally onto the user when the user is standing in said cylinder for blowing dust and particles off of the user, each of said curved ducts having a first end, a second end and an outside wall extending between said first end and said second end, each of said curved ducts being elongated between said first end and said second end, said outside side wall of each of said curved ducts being continuously arcuate between said first end and said second end, a back side of said outside wall of each of said curved ducts being attached to an inside surface of said outer wall of said cylinder, each of said pair of curved ducts being oriented to lie on a horizontal plane, said pair of curved ducts being evenly spaced apart from each other and being distributed between said lower divider and said upper divider, each of said plurality of outlet nozzles being integrated into a front side of said outside wall of said respective curved duct, said outlet nozzles being spaced apart from each other and being distributed between said first end and said second end of said respective curved duct, second blower including:

a blower unit being positioned within said first blower space, said blower unit being positioned between said outer wall of said cylinder and said first housing associated with said first blower, said blower unit having an output extending through said upper divider;

a first conduit being fluidly coupled between said output of said blower unit and a respective one of said curved ducts; and a second conduit being fluidly coupled between said pair of curved ducts wherein said blower unit is configured to blow air into each of said curved ducts and outwardly through each of said plurality of outlet nozzles on said pair of curved ducts;

a third blower being integrated into said cylinder, said third blower being positioned on an opposing end of said cylinder with respect to said first blower, said third blower being in communication with said exhaust in said cylinder, said third blower being oriented to have a direction of flow that is colinear with said direction of flow of said first blower wherein said third blower is configured to blow the dust and particles from the user outwardly through said exhaust thereby facilitating the user to be cleaned of the dust and particles, said third blower comprising:

a second housing being positioned within said second blower space, said second housing surrounding said air holes in said lower divider;

a motor being positioned within said second housing, said motor associated with said third blower having an output shaft being directed toward said lower end of said cylinder; and a fan being attached to said output shaft associated with said third blower, said fan associated with said third blower being aligned with said plurality of air holes in said lower divider wherein said fan associated with said third blower is configured to urge the dust and particles through said air holes in said lower divider and into said second housing when said motor associated with said third blower is turned on;

an exhaust port being fluidly coupled between said second housing and said exhaust in said outer wall of said cylinder wherein said exhaust port is configured to facilitate said third blower to blow air outwardly through said exhaust, said exhaust port including a mesh screen being aligned with said exhaust in said outer wall of said cylinder wherein said mesh screen is configured to inhibit object from entering said exhaust port from outside of said cylinder;

a filter being positioned within said exhaust port wherein said filter is configured to filter the dust and particles from the air being blown into said exhaust port thereby inhibiting the dust and particles from being released from said cylinder;

a control panel being positioned within said cylinder wherein said control panel is configured to be accessible to the user when the user is standing in said cylinder, said control panel including an on button and an off button, said control panel being electrically coupled to said motor associated with said first blower and said motor associated with said third blower and said blower unit, each of said motor associated with said first blower and said motor associated with said third blower and said blower unit being turned on when said on button is depressed, each of said motor associated with said first blower and said motor associated with said third blower and said blower unit being turned off when said off button is depressed; and a power supply being integrated into said cylinder, said power supply being electrically coupled to said motor associated with said first blower and said motor associated with said third blower and said blower unit, said power supply comprising:

a motor controller being electrically coupled to said motor associated with said first blower and said motor associated with said third blower and said blower unit; and a power cord being coupled to and extending away from said cylinder, said power cord being electrically coupled to said motor controller, said power cord having a male plug being electrically coupled to a distal end of said power cord for plugging in to a female electrical outlet.

* * * * *